J. F. MILLIGAN.
Circular-Saw.
No. 199,852.    Patented Jan. 29, 1878.
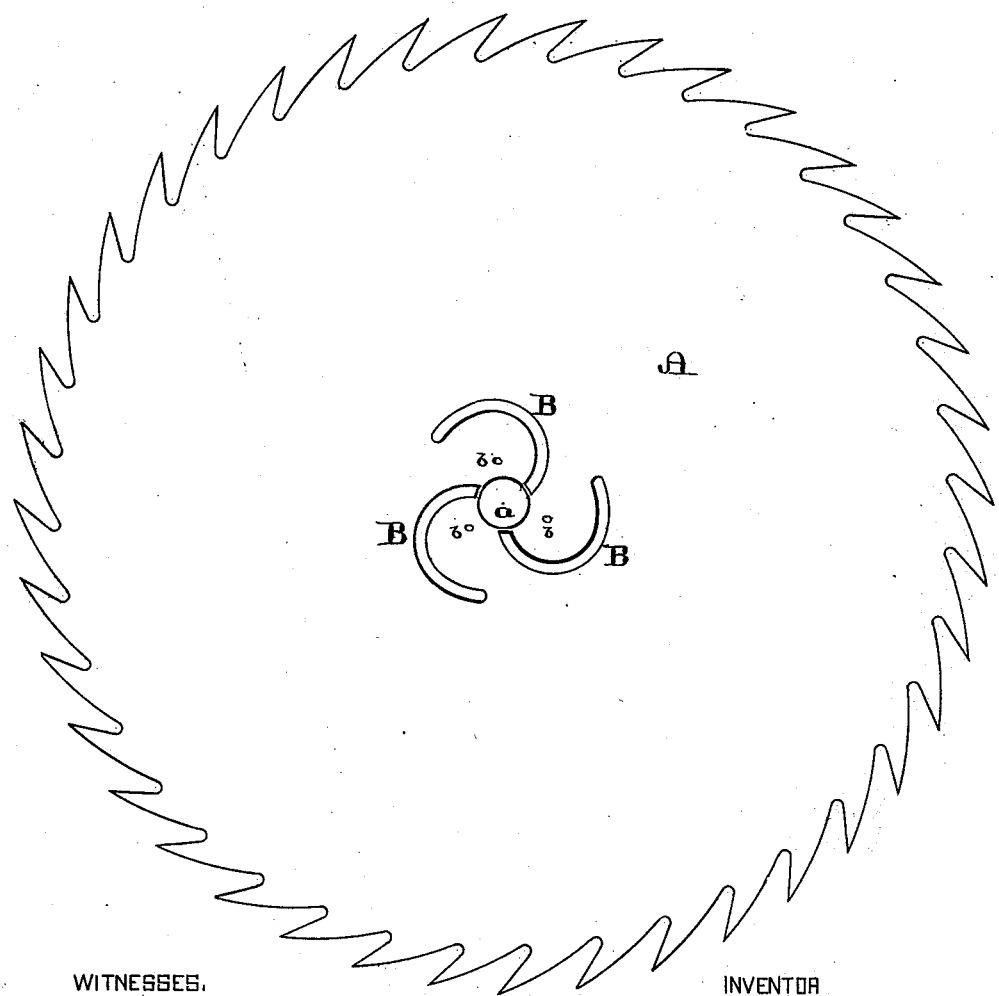
WITNESSES.
Charles Pickles
Saml. V. Boyd
INVENTOR
Jno. F. Milligan
by Chas. O. Moody
atty

UNITED STATES PATENT OFFICE.

JOHN F. MILLIGAN, OF ST. LOUIS, MISSOURI, ASSIGNOR TO JOSEPH W. BRANCH, OF SAME PLACE.

IMPROVEMENT IN CIRCULAR SAWS.

Specification forming part of Letters Patent No. 199,852, dated January 29, 1878; application filed March 10, 1876.

*To all whom it may concern:*

Be it known that I, JOHN F. MILLIGAN, a resident of the city and county of St. Louis, State of Missouri, have invented a new and useful Improvement in Circular Saws, of which the following is a full, clear, and exact description, reference being had to the annexed drawing, making part of this specification.

I have heretofore made an improvement in the construction of a circular saw for the purpose of obviating the difficulty arising from the excessive heating of the central portion of the saw in use.

The present invention relates to the same subject. It is, however, an improvement thereon, in that the saw-blade is not only left in a stronger condition, but so that it can be easily and properly adjusted in tempering.

In the annexed drawing, A represents a circular saw, having the usual eye $a$ and holes $b\ b\ b$ for attaching the saw to the collar. B B B represent a series of curved slots, arranged in what may be termed the central portion of the blade of the saw—that is, the portion lying immediately around the eye, and extending as follows: Beginning near the eye, they extend outward therefrom, and around in the central part of the saw-blade, so that the outward end of each slot overlaps, or nearly overlaps, the inner end of the next slot, as shown. The series B B B may consist of two, three, or more slots, and they may be of any desired curvature. It is essential, however, that the axis of a slot be a continuous curve; that the inner ends, respectively, of the slots do not extend into the eye $a$; and that the slots be extended outward and around, so as to include between them and the eye the principal portion of the central part of the saw-blade. Now, when this central part becomes unduly heated, it can be readily liberated, for, by reason of the peculiar arrangement of the slots, the central part of the blade is practically surrounded by them, and the metal can expand in all directions. At the same time the strength of the blade is not impaired, and, as the slots do not extend into the eye of the blade, the proper appliances can be easily and properly applied to the blade during its adjustment in tempering. These slots are also useful in enabling the saw to be run at different rates of speed.

I am aware of, and disclaim, the construction of E. W. Tilton, wherein a double set of slots upon radial lines is used.

What I claim is—

A circular saw constructed with curved slots B B B, arranged between the eye and periphery, substantially as and for the purpose set forth.

JOHN F. MILLIGAN.

Witnesses:
 CHAS. D. MOODY,
 JOHN J. SQUIRE.